(12) United States Patent
Kingsbury et al.

(10) Patent No.: US 10,747,860 B2
(45) Date of Patent: Aug. 18, 2020

(54) SITTING POSTURE FOR BIOMETRIC IDENTIFICATION

(71) Applicant: Lenovo (Singapore) Pte. Ltd., Singapore (SG)

(72) Inventors: Timothy Winthrop Kingsbury, Cary, NC (US); Joseph Michael Pennisi, Apex, NC (US); Igor Stolbikov, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 162 days.

(21) Appl. No.: 15/243,060

(22) Filed: Aug. 22, 2016

(65) Prior Publication Data

US 2018/0052982 A1    Feb. 22, 2018

(51) Int. Cl.
*G06F 21/00*    (2013.01)
*G06F 21/32*    (2013.01)
*G06F 21/62*    (2013.01)

(52) U.S. Cl.
CPC .......... *G06F 21/32* (2013.01); *G06F 21/6218* (2013.01)

(58) Field of Classification Search
CPC ................................ G06F 21/31; G06F 21/32
USPC ....................................... 726/16–18; 713/186
See application file for complete search history.

(56) References Cited

U.S. PATENT DOCUMENTS

| | | | |
|---|---|---|---|
| 9,235,750 B1* | 1/2016 | Sutton | G06K 9/00845 |
| 2003/0052799 A1* | 3/2003 | Weigl | B64D 45/0015 340/945 |
| 2005/0080533 A1* | 4/2005 | Basir | B60N 2/002 701/45 |
| 2006/0273880 A1* | 12/2006 | Yuhara | B60R 25/255 340/5.83 |
| 2016/0311400 A1* | 10/2016 | Gennermann | B60R 25/2018 |

FOREIGN PATENT DOCUMENTS

| | | | |
|---|---|---|---|
| CN | 1871152 A | 11/2006 | |
| CN | 102815232 A | 12/2012 | |
| CN | 104793733 A | 7/2015 | |
| CN | 105774707 A | 7/2016 | |
| CN | 105829174 A | 8/2016 | |
| EP | 1698529 A1 * | 9/2006 | ........... B60R 25/255 |
| KR | 20140032082 A * | 3/2014 | |

OTHER PUBLICATIONS

Workshop on Ubiquitous Data Mining: ECAI 2012; People Identification Based on Sitting Patterns; Nguyen Gia etal.*
Desing and implementation of a system for body posture recognition; Ali Asghar; Published online: Jul. 31, 2012; Springer Scient Business Media, LLC 2012.*

(Continued)

*Primary Examiner* — Hosuk Song
(74) *Attorney, Agent, or Firm* — Ference & Associates LLC (57) ABSTRACT

One embodiment provides a method, including: obtaining, using one or more sensors disposed in a seat, user posture data; and identifying, using a processor, a user based on the user posture data. Other aspects are described and claimed.

21 Claims, 4 Drawing Sheets

(56) References Cited

OTHER PUBLICATIONS

Supporting Implicit Human-to-Vehicle Interaction: Driver Identification from Sitting Postures; Andreas Riener and Alois Ferscha; ISVCS 2008, Jul. 22-24, 2008 Dublin Irelans; Copyright 2008 ACM ISBN 978-963-9799-27.*

Soft authentication and behavior analysis using a chair with sensors attached: hipprint authentication; M. Yamada et al; Springer-Verlag London Limited 2008.*

Gia et al., "People Identification Based on Sitting Patterns", IPSJ SIG Technical Report, vol. 2011-BI-31 No. 23, Jul. 15, 2011, 7 pages, Japan.

* cited by examiner

SITTING POSTURE FOR BIOMETRIC IDENTIFICATION

BACKGROUND

Biometric identification is utilized in many circumstances. For example, security mechanisms often are based on, or include, use of a biometric component such as a fingerprint reader, an iris scanner, a voice recognition mechanism, an image analysis/facial detection mechanism, etc., that can be used to identify a particular user. For example, system access (e.g., login credentialing) might be conditioned on a biometric identification. In addition to security mechanisms, biometric identification is utilized to customize a system or device. For example, biometric identification might be used to properly identify a particular user and thereafter load the particular user's preferred device settings.

BRIEF SUMMARY

In summary, one aspect provides a method, comprising: obtaining, using one or more sensors disposed in a seat, user posture data; and identifying, using a processor, a user based on the user posture data.

Another aspect provides a device, comprising: an input element; a processor operatively coupled to the input element; and a memory that stores instructions executable by the processor to: obtain, using the input element, user posture data from one or more sensors; and identify a user based on the user posture data.

A further aspect provides a system, comprising: a seat having one or more sensors disposed therein; and a device, comprising: an input element; a processor operatively coupled to the input element; and a memory that stores instructions executable by the processor to: obtain, using the input element, user posture data from the one or more sensors disposed in the seat; and identify a user based on the user posture data.

A still further aspect provides a vehicle, comprising: a passenger compartment comprising a seat having one or more sensors disposed therein; an engine that is coupled to a plurality of wheels; and a device, comprising: an input element; a processor operatively coupled to the input element; and a memory that stores instructions executable by the processor to: obtain, using the input element, user posture data from the one or more sensors disposed in the seat; identify a user based on the user posture data; and permit the engine to operate in response to identifying the user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Biometric based security measures for computers tend to be flawed because they can be spoofed in a variety of ways. Rather than using biometric security as a primary mechanism of security, an alternative approach is to use multiple layers of biometric security simultaneously. It is then possible that one layer might be imitated, but it would be difficult to spoof multiple layers.

Common methods of providing biometric identification include: use of iris scans, fingerprints, as well as employing voice recognition and facial recognition. A common drawback for all of these methods is that the user's biometric qualities can be imitated by a determined imposter that is trying to circumvent the security mechanisms. To better facilitate providing multiple layers of biometric security, it is useful to gather as much uniquely identifiable information about the user's body as possible.

An embodiment employs useful biometric data in the form of a user's sitting style or posture. Everyone has a tendency to sit in a set of postures that is relatively unique. A user's preferred styles of sitting provide a fairly unique biometric signature that can be combined with other security measures to reduce the chances of successful imitation.

Data about a user's posture can be gathered from a variety of sensors, e.g., sensors in a seat, sensors in a seat back, sensors in the legs of a seat or chair, a camera directed towards or viewing a seat, etc. The sensors provide dynamic biometric based measurements, for example measurements of pressure, weight distribution, seat physical configuration (such as tilt), distance from a device, and heat or temperature data (e.g., detected as the user shifts and changes positions through the course of using a device such as a computer).

Over time, a system can learn the user's movement patterns, posture and preferred sitting styles. Most users tend to have unique signatures in terms of how they shift their weight, when they stand up and sit down, etc.

In an embodiment, user posture data is collected and evaluated on an ongoing basis. For example, if a user leaves his or her chair for a period of time and then returns, the system will verify that the detected movement patterns match the typical behavior for the expected user. In the case where multiple users share the same chair, a user's movements may provide an additional hint to help determine the user's identity.

As an example, if an imposter sits down at another user's computer and displays a large picture of the expected user and plays a voice recording, it might be possible to trick the computer into validating the incorrect user based on this identification image and voice data. However, when the imposter sits down, a number of biometric details might be flagged as incorrect. For example, metrics such as the user's method of sitting down, the total weight in the chair and the positioning of the weight from left to right and front to back might not be correct in terms of an expected user's biometric posture data. Thus, if the sitting metrics do not match the expected user, then more heightened security measures could be required, such as passwords and two factor authentication.

An embodiment provides continuous or ongoing evaluation of user posture data to refine a user's biometric signature. For example, as the user works with the device over time, the user's posture and sitting habits are monitored. As additional user posture data is collected, a more accurate biometric signature is created. Furthermore, if the user's behavior then changes substantially or the user gets up and leaves, the device is capable of recognizing this change and taking action, e.g., automatically locking and requiring additional authentication.

Alternatively, if a user's identity is called into question, instead of locking the device, the device could move into a reduced privilege or guest mode, e.g., where only limited functionality is available without further authentication.

As will become apparent throughout the description, an embodiment can be extended to cover many devices and systems, e.g., used with closely integrated chairs or seats, such as cars and car seats.

The illustrated example embodiments will be best understood by reference to the figures. The following description is intended only by way of example, and simply illustrates certain example embodiments.

Figure 1:
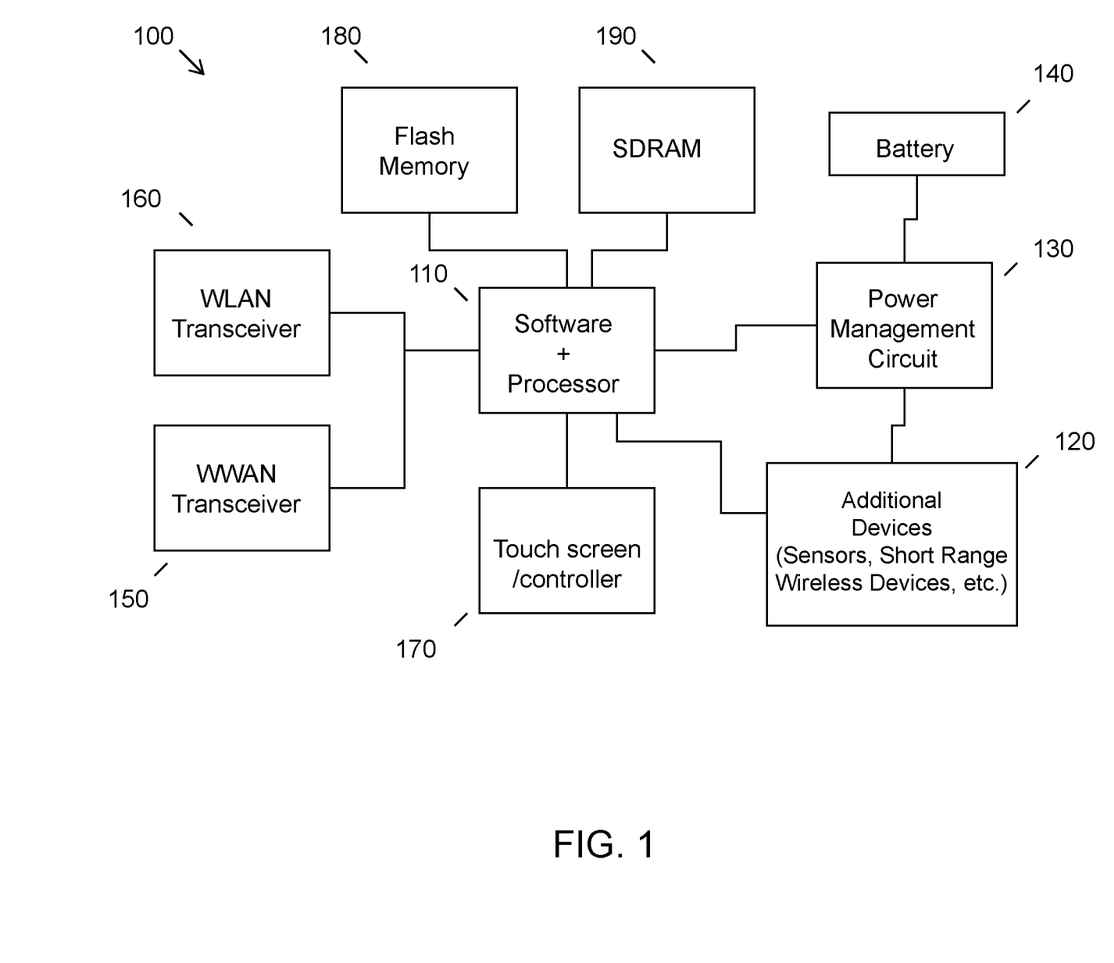
FIG. 1 illustrates an example of information handling device circuitry.

While various other circuits, circuitry or components may be utilized in information handling devices, with regard to mobile device circuitry 100, an example illustrated in FIG. 1 includes a system on a chip design found for example in many smaller or mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included and may be added based on a particular design. For example, additional devices 120 may include a sensor or sensor(s), for example an optical sensor such as a camera and/or an infrared sensor, contact based sensors, weight sensors, etc., as well as short range wireless devices, e.g., BLUETOOTH wireless communication devices. System 100 often includes a touch screen 170 for data input and display/rendering. System 100 also typically includes various memory devices, for example flash memory 180 and SDRAM 190.

Figure 2:
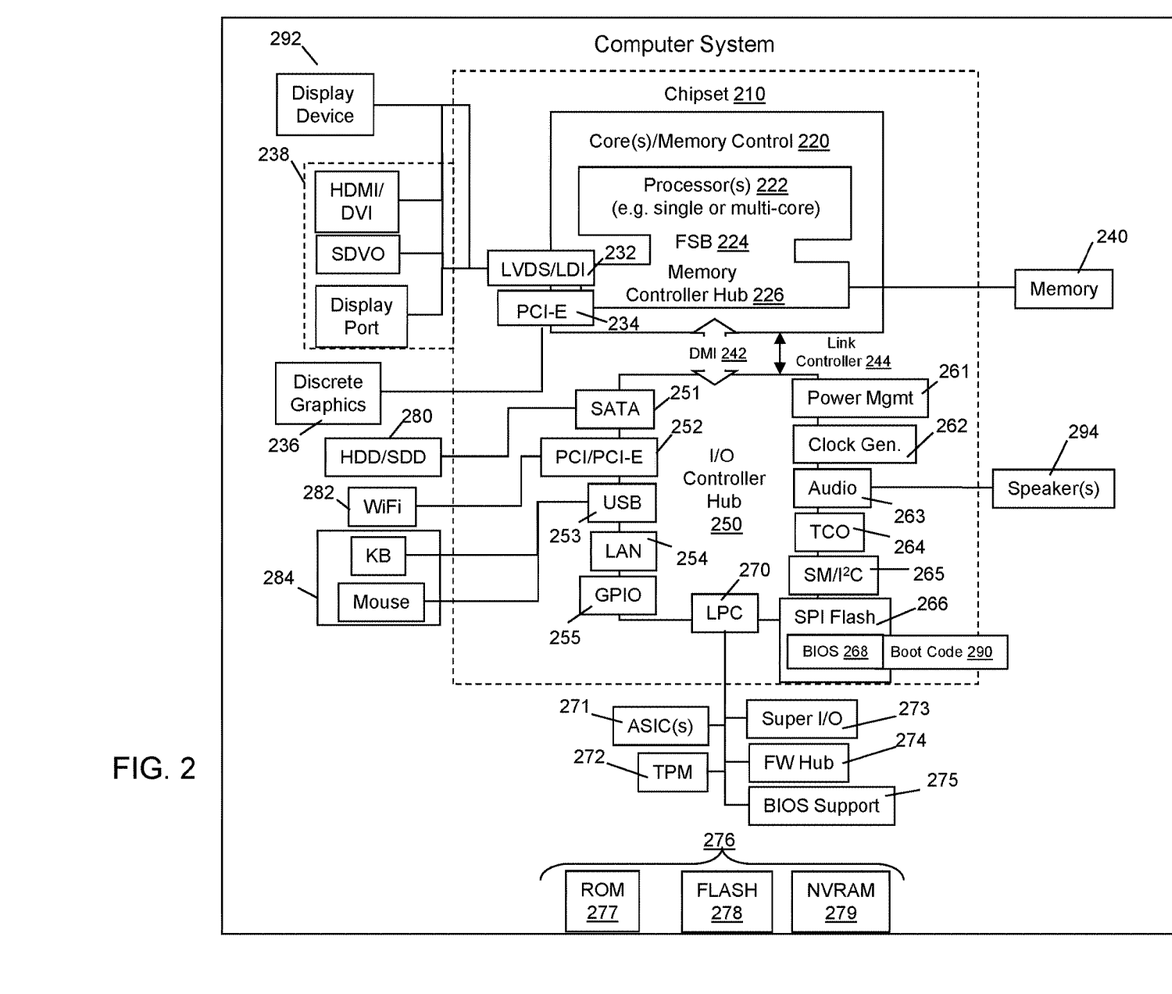
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric data capture device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as a computing device that obtains user posture data and uses the same to conduct biometric identification of a user. For example, the circuitry outlined in FIG. 1 might be included in an on-board computer of a car, where inputs from sensors in a car seat provide user posture data to perform biometric identification. As another example, the circuitry outlined in FIG. 2 might be included in a desktop or laptop computer that obtains user posture data to perform biometric identification, e.g., from sensors disposed in or viewing a desk chair or other seat. As will be appreciated by reviewing this description, other types of devices may be utilized. For example, the circuitry outlined in FIG. 1 and/or FIG. 2 may be included in a smart TV or other media player, where user posture data is derived from a three dimensional (3D) sensor or camera, from a seat or chair, or a combination of the foregoing.

Figure 3:
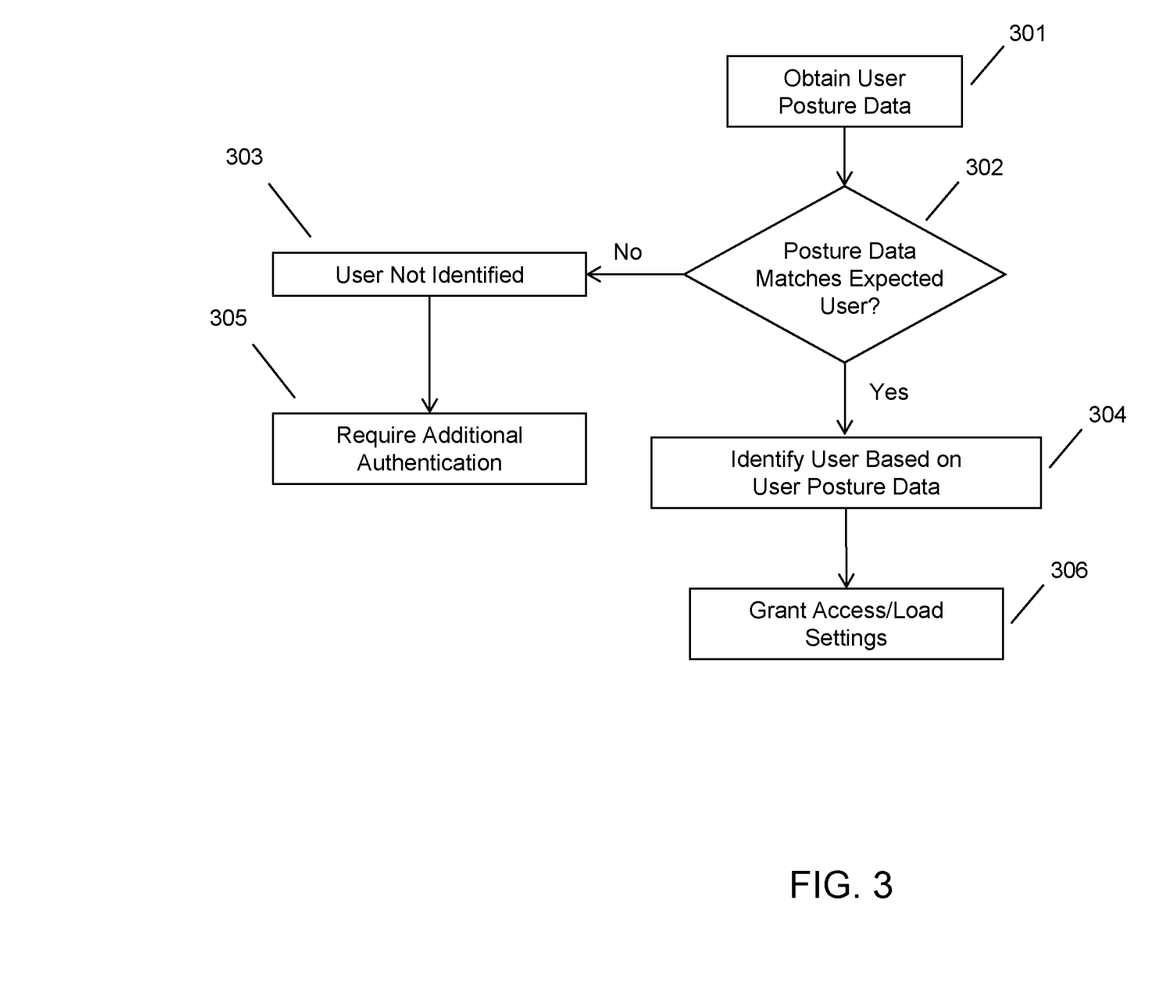
FIG. 3 illustrates an example method of biometric identification using posture data.

Turning to FIG. 3, an embodiment obtains user posture data, e.g., from sensors disposed in a seat or chair, at 301. The user posture data may include posture data that permits an inference as to the user's posture.

User posture data may take a variety of forms. For example, the user posture data obtained at 301 may include weight data collected from a weight sensor included in a seat or chair and reported wirelessly to a device such as a car's onboard computer, a desktop or laptop computer and/or a media player within wireless range of the seat or chair, etc. As another example, user posture data might include weight distribution data collected from a plurality of weight sensors, where the weight distribution data permits an inference or calculation of a user's posture as he or she sits in a seat or chair. Further, the user posture data may include seat configuration data, e.g., data indicating that the seat's back has been tilted, data indicating that a seat has been raised or lowered, etc. As a further example, user posture data may include seat contact data, e.g., data from contact, temperature or pressure sensors disposed within a seat indicating that a user is contacting or pressing on a particular part of the seat. As a yet further example, user posture data may include distance data, e.g., data that indicates that a user is seated a particular distance away from another device. By way of specific example, the distance data may be image data collected by a camera or 3D sensor that detects a range between a user and/or seat and another device, e.g., a laptop computer, a desktop computer, a steering wheel of a car, etc. As a further example, user posture data may include data collected from an orientation sensor or sensor package, e.g., a module that is added or applied to a seat or chair to sense motion and/or orientation data of the seat or chair, e.g., as for example detectable when a user moves the seat or chair. As will be appreciated by those having skill in the art, various types of user posture data may be combined to provide a biometric signature of a particular user. This biometric signature may be refined over time, e.g., by collecting user posture data repeatedly and updating a user's biometric signature.

The user posture data obtained at 301 is used to determine if the user posture data matches expected user posture data at 302. That is, the currently detected user posture data obtained at 301 is compared to known user posture data of a particular user in order to identify the particular user. The known user posture data may be stored locally or accessed from a remote device. The known user posture data may include a biometric signature or profile that has been generated based on historically detected user posture data.

If the user is identified, as illustrated at 304, using the user posture data obtained at 301, i.e., the currently detected user posture data is similar or equivalent to known user posture data, the user may be granted access to a device, have continued access to a device, or have particular settings (e.g., user-specific or customized settings) loaded, as illustrated at 306. Otherwise, i.e., if a user is not identified at 302, as illustrated at 303, the lack of user identification may lead to a requirement for further authentication data, as illustrated at 305, and/or may result in reduced device functionality.

For example, a guest setting may be applied to a desktop computer or a media player (e.g., smart TV) if a particular user is not identified at 302. Similarly, if a particular user is not identified at 302, a valet setting may be applied to an automobile computer or other vehicle-connected device (e.g., smart phone). The guest or valet setting may include reduced access to certain applications or device features. By way of specific example, if a particular user is identified at 302, full device access or user-specific device access is granted at 306, e.g., an address book may be accessible, a communication application may be accessible, and a navigation application may be accessible. In contrast, i.e., if a particular user is not identified at 302, reduced functionality may be implemented for a given device. For example, an address book, a communication application, and a navigation application may be locked until further or additional authentication is provided, as illustrated at 305.

As described herein, the biometric identification may be included in a security mechanism for a device such as a laptop or desktop computer, a media player or smart TV, a car's on-board computer, etc. Thus, if a user is identified using the user posture data, some user-specific functionality may be provided by the device. In contrast, if the particular user is not identified using the user posture data, a reduce functionality or guest setting may be applied, subject to further identification being made, e.g., using a password or alternative biometric identification (fingerprint reader, voice authentication system, etc.).

User posture data may be used to identify a user at various times. For example, an embodiment may utilize user posture data on an on-going basis. By way of specific example, user posture data may be obtained at 301, and a determination made at 302, repeatedly, e.g., according to a policy as a user operates a device. Thus, the user may be initially granted access (with or without use of posture-based biometric identification) and thereafter may be required to continue to supply correct user posture data in order to maintain the level of access to the device. This permits the use of user posture data to supplement other types of security mechanisms that might be applied, e.g., other biometric identification techniques, smart card security techniques, alphanumeric password based identification, etc.

Figure 4:
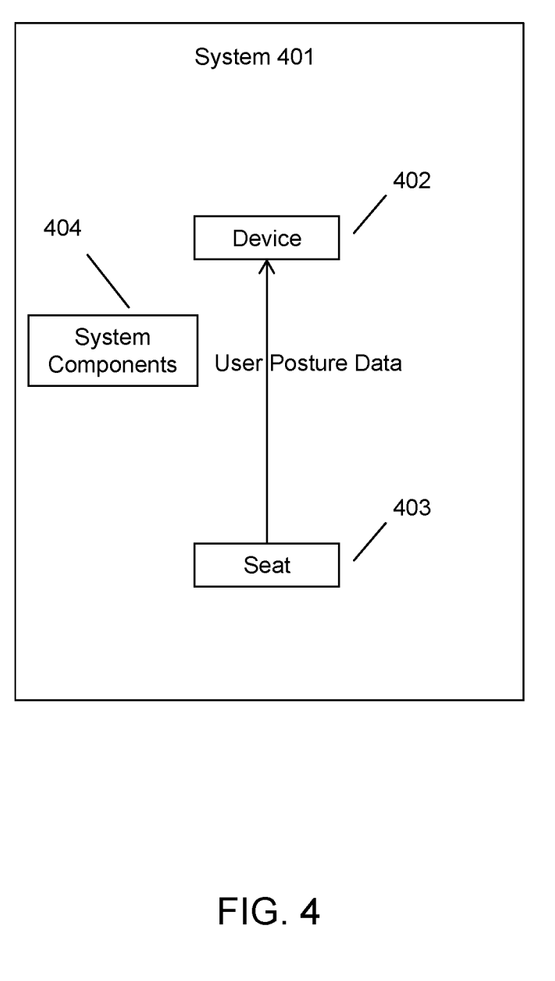
FIG. 4 illustrates an example system that uses posture data for biometric identification.

The use of posture data in biometric identification may be applied in a wide variety of system types. Turning to FIG. 4, an example system 401 is illustrated. As shown, a system 401 may include a combination of: a device 402 (such as a computing device selected from the group consisting of a personal computer (e.g., tablet, laptop, desktop, etc.), a media device such as a smart TV, and a vehicle's onboard computer (e.g., onboard car computer)); and a seat 403 (such as a desk seat, a chair or sofa in a user's room, or chair or a vehicle's seat, e.g., a car seat). The system may include various other system components 404, e.g., peripheral devices that communicate with the device 402 and/or the seat 403, vehicle components such as an engine, wheels, etc.

An embodiment uses posture data to supplement other biometric based security measures, e.g., for devices 402 such as computers. In an embodiment, biometric posture data is used as one of multiple layers of biometric security for granting or denying access or an access type to a device 402.

Data about a user's posture can be gathered from a variety of sensors, e.g., in a seat 403 (including but not limited to sensors in a seat back or bottom, sensors in or on the legs of a seat 403, a camera directed towards or viewing a seat 403, etc.). The sensors provide dynamic biometric based measurements, for example measurements of pressure, weight distribution, seat tilt, distance from a device, and heat or temperature data. As described herein, over time, a system 401 can learn the user's movement patterns, posture and preferred sitting styles.

In an embodiment, posture biometric data is used on an ongoing basis. For example, if a user leaves his or her seat 403 for a period of time and then returns, the system 401 will verify that the detected movement patterns match the typical behavior for the expected user. In the case where multiple users share the same seat 403, a user's movements may provide an additional hint to help determine the user's identity.

As an example, if a different driver sits down in another user's car seat 403, a number of biometric details might be flagged as different or non-matching, e.g., as illustrated at 302, 303 of FIG. 3. For example, metrics such as the user's method of sitting down, the total weight in the seat 403 and the positioning of the weight from left to right and front to back within the seat 403 might not be correct in terms of an expected user's biometric posture data. Thus, if the sitting metrics do not match the expected user, then different settings (e.g., vehicle settings) might be implemented, e.g., the vehicle's electronics might be set to a valet mode, the vehicle's seat may be automatically moved or adjusted, the vehicle compartment may be adjusted, etc.

An embodiment provides continuous, periodic or intermittent authentication using posture data. For example, as the user works with the device 402 over time, the user's posture and sitting habits in the seat 403 are monitored. If the user's behavior changes substantially or the user gets up and leaves, then the device 402 will automatically lock itself and require additional authentication. Alternatively, if a user's identity is called into question, instead of locking the device, the device could move into a reduced privilege or guest mode, e.g., where only limited functionality is available without further authentication.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
obtaining, using one or more sensors disposed in a seat and one or more sensors not disposed in the seat bottom, dynamic user posture data;
identifying, using a processor, a user from the dynamic user posture data by comparing the dynamic user posture data to known user posture data, wherein the identifying comprises combining the dynamic user posture data into a biometric signature of the individual using the seat and comparing the biometric signature to an expected user, wherein responsive to determining the user is the expected user, a device performs an action on the device associated with the expected user; and
responsive to determining the identified user is not an expected user, requesting further authentication from the user, wherein the further authentication is based at least in part on a two factor authentication.

2. The method of claim 1, further comprising adjusting, using a processor, a setting of a device based on the user identified.

3. The method of claim 2, wherein the adjusting comprises granting access to the device.

4. The method of claim 2, wherein the adjusting comprises granting a type of access to the device.

5. The method of claim 4, wherein granting a type of access to the device comprises granting access to a device feature selected from the group consisting of an address book, a communication application, and a navigation application.

6. The method of claim 2, wherein the adjusting comprises changing a physical configuration of the seat based on the user identified.

7. The method of claim 6, wherein the changing comprises moving at least one movable component of the seat.

8. The method of claim 1, wherein the dynamic user posture data is selected from the group consisting of weight data, weight distribution data, seat configuration data, seat contact data, and distance data.

9. The method of claim 1, wherein the obtaining comprises obtaining user posture data over a period of time.

10. The method of claim 1, wherein the identifying comprises repeatedly identifying the user based on the dynamic user posture data.

11. A device, comprising:
an input element;
a processor operatively coupled to the input element; and
a memory that stores instructions executable by the processor to:
obtain, using the input element, dynamic user posture data from one or more sensors disposed in a seat and one or more sensors not disposed in the seat bottom;
identify a user from the dynamic user posture data by comparing the user posture data to known user posture data, wherein the identifying comprises combining the dynamic user posture data into a biometric signature of the individual using the seat and comparing the biometric signature to an expected user, wherein responsive to determining the user is the expected user, a device performs an action on the device associated with the expected user; and
responsive to determining the identified user is not an expected user, requesting further authentication from the user, wherein the further authentication is based at least in part on a two factor authentication.

12. The device of claim 11, wherein the instructions are executable by the processor to adjust a setting of the device based on the user identified.

13. The device of claim 12, wherein the instructions are executable by the processor to grant access to the device based on the user identified.

14. The device of claim 12, wherein the instructions are executable by the processor to grant a type of access to the device based on the user identified.

15. The device of claim 14, wherein the instructions are executable by the processor to grant a type of access to a device feature selected from the group consisting of an address book, a communication application, and a navigation application.

16. The device of claim 11, wherein the dynamic user posture data is selected from the group consisting of weight data, weight distribution data, seat configuration data, seat contact data, and distance data.

17. The device of claim 11, wherein the input element comprises a camera, and further wherein the posture data comprises image data obtained through the camera.

18. The device of claim 11, wherein the instructions are executable by the processor to obtain user posture data over a period of time.

19. The device of claim 11, wherein the instructions are executable by the processor to repeatedly identify the user based on the dynamic user posture data.

20. A system, comprising:
a seat having one or more sensors disposed therein and one or more sensors not disposed in the seat; and
a device, comprising:
an input element;
a processor operatively coupled to the input element; and
a memory that stores instructions executable by the processor to:
obtain, using the input element, dynamic user posture data from the one or more sensors disposed in the seat bottom;
identify a user from the dynamic user posture data by comparing the user posture data to known user posture data, wherein the identifying comprises combining the dynamic user posture data into a biometric signature of the individual using the seat and comparing the biometric signature to an expected user, wherein responsive to determining the user is the expected user, a device performs an action on the device associated with the expected user; and
responsive to determining the identified user is not an expected user, requesting further authentication from the user, wherein the further authentication is based at least in part on a two factor authentication.

21. A vehicle, comprising:
a passenger compartment comprising a seat having one or more sensors disposed therein;
an engine that is coupled to a plurality of wheels; and
a device, comprising:
an input element;
a processor operatively coupled to the input element; and a memory that stores instructions executable by the processor to:

obtain, using the input element, dynamic user posture data from the one or more sensors disposed in the seat and one or more sensors not disposed in the seat bottom;

identify a user from the dynamic user posture data by comparing the user posture data to known user posture data, wherein the identifying comprises combining the dynamic user posture data into a biometric signature of the individual using the seat and comparing the biometric signature to an expected user, wherein responsive to determining the user is the expected user, a device performs an action on the device associated with the expected user;

responsive to determining the identified user is not an expected user, request further authentication from the user, wherein the further authentication is based at least in part on a two factor authentication; and permit the engine to operate in response to identifying the user.

* * * * *